Patented Nov. 27, 1973

3,775,315
MANUFACTURE OF AMMONIUM POLYPHOSPHATE

Raymond Anthony Smith, Walsall, and Ralph Thomas Russell, Brierley Hill, England, assignors to Albright & Wilson Limited, Birmingham, England
No Drawing. Filed Feb. 18, 1972, Ser. No. 227,676
Claims priority, application Great Britain, Feb. 23, 1971, 5,269/71
Int. Cl. C01b 25/28; C09k 3/28
U.S. Cl. 252—1       20 Claims

ABSTRACT OF THE DISCLOSURE

Modified ammonium polyphosphates containing a detergent (water-active agent) constituent are prepared by reacting an ammoniating agent such as urea or thiourea with a phosphoric acid reagent in the presence of from 1 to 35% by weight based on the total weight of $P_2O_5$ in the reaction mixture of a wetting agent. The product may be obtained in soluble form having built-in detergency for use in detergents or liquid fertilizers, or in a water-insoluble form having fire-retardant properties suitable for intumescent paints and fire extinguishing compositions.

---

The present invention relates to the manufacture of ammonium polyphosphates by the reaction of organic ammoniating agents with phosphoric acid.

The production of ammonium polyphosphates differs from that of the corresponding alkali metal polyphosphates in that heating ammonium orthophosphate tends to cause evolution of ammonia rather than dehydration to condensed phosphates. In consequence it is only recently that the successful preparation of ammonium polyphosphates has been claimed. The methods which have been successfully employed involve the reaction of an organic ammoniating agent, typically urea, with orthophosphoric or condensed phosphoric acid. The reaction product obtained has a formula and properties similar to those expected for ammonium polyphosphate, and is commonly so called. The reaction product is believed to comprise the ammonium salts of a condensed acid comprising chains of phosphatic units of the formula

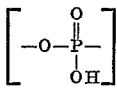

and including, possibly, units of the formulae

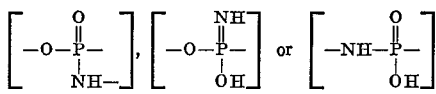

In our application No. 853,215, filed Aug. 26, 1969, we have described modified ammonium polyphosphates wherein the condensed phosphate chains include non-phosphatic units such as

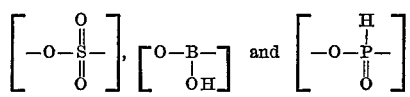

As used herein the expression "ammonium polyphosphate" includes the aforementioned reaction products and modified polyphosphates.

We have discovered that improved ammonium polyphosphates, particularly suitable for use in detergent compositions can be prepared when the known condensation reaction of ammoniating reagents with phosphoric acid reagents is modified by the presence of a wetting agent.

Our invention therefore provides an improvement in the method of preparing ammonium polyphosphates by reaction of an organic ammoniating agent with a phosphoric acid reagent, which comprises performing the reaction in the presence of a wetting agent.

The organic ammoniating agent may be any amine or amide which reacts with phosphoric acid to form an ammonium polyphosphate, especially urea or thiourea. The phosphoric acid reagent may be orthophosphoric acid, an alkali metal or ammonium acid phosphate, a condensed phosphoric acid or a suspension of $P_4O_{10}$ in a phosphoric acid (e.g. a suspension of $P_4O_{10}$ in tetraphosphoric acid). Preferably the acid contains from 78 to 83% $P_2O_5$ by weight total. The reaction mixtures may comprise a partially reacted mixture of the ammoniating agent and the phosphoric acid reagent e.g. urea orthophosphate. The reaction mixture may contain modifying agents such as are described in our aforesaid application, for example sulphuric acid, sulphates, boric oxide, borates, phosphorous acid, phosphites or sulphites.

The wetting agent may be any organic surfactant that reduces the surface tension of aqueous systems, thereby facilitating the wetting of solid surfaces. As used herein, the term includes: hydrotropes such as alkali metal benzene sulphonates having from 1 to 6 aliphatic carbon atoms, e.g. sodium toluene sulphonate, sodium xylene sulphonate; potassium cumene sulphonate, or sodium hexyl benzene sulphonate detergents, including alkali metal alkyl benzene sulphonates having from 7 to 20 aliphatic carbon atoms e.g. sodium dodecyl benzene sulphonate, alkali metal alkyl sulphates having from 7 to 25 carbon atoms, e.g. sodium or lithium lauryl sulphate, fatty acid taurates, e.g. sodium N methyl N oleyl taurate, fatty acid isethionates of the formula $RCOO(CH_2)_2SO_3M$ wherein R is an alkyl group having from 6 to 20 carbon atoms and M is an alkali metal or ammonium group; and non-ionic wetting agents including the condensation products of propylene and/or ethylene oxide with a fatty acid, fatty alcohol, alkyl phenol, fatty amide, or fatty ester of a di- or polyhydric alcohol such as glycerol or sorbitan. The non-ionic wetting agents typically have from 8 to 25 carbon atoms in the hydrophobic part of the molecule and from 2 to 20, e.g. 5 to 10 alkylene oxide residues in the hydrophilic part, e.g. stearyl ethoxylate, nonyl phenyl ethoxylate, coconut diethanolamide or an alkylene oxide condensate of sorbitan monooleate or glyceryl stearate. The preferred wetting agents are those which do not decompose at temperatures below 200° C.

The most preferred wetting agents are the fatty acid taurates, of the formula $RCONR'(CH_2)_2SO_3M$ where R is an alkyl group having from 6 to 20 carbon atoms and R' is hydrogen or an alkyl group having from 1 to 5 carbon atoms e.g. methyl and M is an alkali metal or ammonium group. It has been found that these give substantially reduced foaming, causing the product to dry to a crumbly solid, often without foaming out of the reactor.

The wetting agent may be employed in a proportion of from 1 to 35%, preferably of from 5 to 25% by weight of the total $P_2O_5$ e.g. from 10 to 20% by weight of the total $P_2O_5$.

The condensation reaction normally commences at a temperature between 130 and 160° C., and thereafter proceeds with evolution of heat and frothing. The temperature may rise to 200° C. or higher. Typically the reagents are mixed and allowed to react partially to form such intermediate products as the orthophosphate salts of the ammoniating agent. The mixtures may then be heated until the exothermic condensation reaction commences. Preferably the heating is then withdrawn and the reaction allowed to proceed. It is desirable that the heating and frothing of the reaction should be controlled for example by cooling and stirring to prevent over-heating; (e.g. temperatures in excess of 200–220° C. should be avoided if a water soluble product is required).

The water soluble reaction products are particularly suitable for use in solid or liquid detergents. They may be employed in admixture with conventional detergent ingredients. It has also been found that the method of the invention often imparts a measure of "built in" detergency to the polyphosphate product itself.

The water soluble product is also suitable for use in fertilisers, especially liquid fertilisers.

The water soluble product may be heated at temperatures above 200° C. to form a relatively insoluble polyphosphate suitable for use as a fire retardant in intumescent paints or powder fire extinguishers. Preferably the water soluble product is calcined at temperatures in the range 220 to 300° C. Higher temperatures may be used in some instances, where the ammonium polyphosphate is sufficiently stable to withstand such temperatures without excessive decomposition.

The addition of wetting agents to the reaction mixture, in accordance with our invention, modifies the reaction, making it more easily controllable. It may also provide modified products similar to those described in our aforesaid patent application, which are more water soluble than those obtained in the absence of a wetting agent, and which may also have built-in detergency. If the wetting agent is sufficiently stable to withstand the reaction temperature. This is particularly true in the case of preferred wetting agents with an —$SO_3Na$ or —$SO_4N$ group which, it is believed may react with the phosphoric acid thus incorporating the wetting agent into the polyphosphate molecule.

The invention is illustrated by the following examples:

EXAMPLE 1

178 gm. urea was mixed with 225 gm. of a phosphoric acid having a $P_2O_5$ content of 81% by weight, and with 50 gm. of the oleic acid ester of sodium isethionate, $S_{17}H_{33}COOCH_2CH_2SO_3Na$.

The mixture was heated in an open reaction vessel to 160° C. with stirring when a vigorous reaction commenced. Heating was withdrawn and the reaction mixture was allowed to foam out of the reaction vessel to provide a brown, crumbly product having a soapy smell and water solubility of 10 gm./100 ml. water.

EXAMPLE 2

Example 1 was repeated substituting 45 gm. of sodium N-methyl-N-oleoyl taurate ($C_{17}H_{33}CONCH_3CH_2CH_2SO_3Na$)

for the isethionate.

The product did not foam out of the reaction vessel, but thickened and dried, on stirring at 160° C., to a crumbly white powder, with a soapy smell. The solubility of the product was 7 gm./100 ml. water at 20° C.

EXAMPLE 3

The process of Example 2 was repeated using 118 gm. urea, 170 gm. of 82% $P_2O_5$ phosphoric acid, 14 gm. disodium phosphite ($Na_2HPO_3·5H_2O$) and 25 gm. of sodium N-methyl-N-oleoyl taurate. The crumbly white product had a solubility of 10 gm./100 gm. water at 20° C.

EXAMPLE 4

The process of Example 3 was repeated, substituting sodium toluene sulphonate for the taurate. 268 gm. urea, 392 gm. 81% $P_2O_5$ phosphoric acid, 17 gm. disodium phosphite ($Na_2HPO_3·5H_2O$) and 100 gm. sodium toluene sulphonate were reacted to give a crumbly white foam of water solubility of 10 gm./100 ml., and a sequestering power of 20/expressed as parts sequestrant/part Ca.

EXAMPLE 5

The process of Example 3 was repeated substituting sodium toluene sulphonate for the taurate and boric acid for the phosphite. 268 gm. urea, 486 gm. 82% $P_2O_5$ phosphoric acid, 56 gm. boric acid and 120 gm. sodium toluene sulphonate were reacted to give a hygroscopic crumbly white water soluble foam. The solubility was 16 gm./100 ml. water and the sequestering power was 30.

EXAMPLE 6

The process of Example 1 was repeated substituting the same weight of tertiary butyl phenyl ethoxylate in place of the isethionate. A white crumbly water soluble foam was obtained. The viscous liquor prior to reaction tends to discoloration (brown) if local overheating is allowed to develop.

EXAMPLE 7

The process of Example 1 was repeated using the same weight of sodium dodecyl benzene sulphonate in place of the isethionate. A white or very pale cream crumbly foam was obtained which was water soluble.

We claim:
1. In the method for manufacture of ammonium polyphosphates which comprises reacting together an organic ammoniating agent selected from the group consisting of urea and thiourea and a phosphoric acid reagent the improvement which comprises performing the reaction in the presence of from 1 to 35% based on the total weight of $P_2O_5$ in the reaction mixture of a wetting agent selected from alkyl benzene sulphonates having from 1 to 25 carbon atoms, alkyl sulphates having from 7 to 25 carbon atoms, fatty acid taurates of the formula $RCONR'(CH_2)_2SO_3M$ wherein R is an alkyl group having from 6 to 20 carbon atoms and R' is hydrogen or an alkyl group having from 1 to 5 carbon atoms and M is selected from lithium, sodium, potassium and ammonium, and fatty acid isethionates of the formula

$RCOO(CH_2)_2SO_3M$ wherein R and M have the same significance as aforesaid.

2. In the method for the manufacture of ammonium polyphosphates which comprises reacting an organic ammoniating agent selected from the group consisting of urea and thiourea with a phosphoric acid reagent the improvement which consists in performing the reaction in the presence of from 1 to 35% based on the weight of $P_2O_5$ in the reaction mixture of a wetting agent selected from the condensation products of propylene and ethylene oxide with fatty acids, fatty alcohols, alkyl phenols, fatty amides, and fatty esters of di- and polyhydric alcohols which condensates comprise a hydrophilic part consisting of from 2 to 20 alkylene oxide residues and a hydrophobic part comprising from 8 to 25 aliphatic carbon atoms.

3. A method according to claim 1 wherein said ammoniating agent is urea and said phosphoric acid reagent is selected from ortho phosphoric acid, condensed phosphoric acids, suspensions of phosphorus pentoxide in condensed phosphoric acids and alkali metal and ammonium phosphates and the reaction mixture is heated to a temperature above 130° C. sufficient to initiate an exothermic reaction, and the temperature of the reaction mixture is thereafter maintained below 220° C. to form a water soluble ammonium polyphosphate product.

4. A method for the production of ammonium polyphosphates which consists in calcining the reaction mixture of claim 3 at a temperature between 220 and 300° C. to form a substantially water insoluble ammonium polyphosphate product.

5. A method according to claim 1 which comprises reacting urea and phosphoric acid at a temperature below 130° C. to form urea phosphate, adding the wetting agent and subsequently heating the reaction mixture to a temperature above 130° C. to initiate the exothermic reaction.

6. A method according to claim 3 which consists essentially in heating urea with a reagent selected from orthophosphoric acid, condensed phosphoric acid and suspensions of phosphorus pentoxide in condensed phosphoric acid in the presence of a fatty acid taurate present in a proportion of from 5 to 25% based on the total weight of $P_2O_5$ in the reaction mixture.

7. A method according to claim 6 wherein the phosphoric acid reagent contains within 78 to 83% $P_2O_5$ by weight.

8. A method according to claim 7 wherein the taurate is sodium oleyl taurate.

9. A method according to claim 3 which consists essentially in reacting together urea and a phosphoric acid selected from orthophosphoric acid condensed phosphoric acid and suspensions of phosphorus pentoxide in condensed phosphoric acid in the presence of an alkyl benzene sulphonate detergent having from 6 to 20 aliphatic carbon atoms.

10. A method according to claim 9 wherein the phosphoric acid reagent contains from 78 to 83% by weight of $P_2O_5$ total.

11. A method according to claim 10 wherein the alkyl benzene sulphonate is sodium dodecyl benzene sulphonate.

12. A method according to claim 2 wherein the reaction mixture additionally contains a modifying group selected from sulphuric, phosphorous and boric acid and their alkali metal and ammonium salts.

13. A method according to claim 12 which consists essentially in reacting urea with a phosphoric acid reagent containing from 78 to 83% by weight $P_2O_5$ in the presence of an alkylene oxide condensate of an alkyl phenol at a temperature of at least 130° C. and thereafter maintaining the temperature below 220° C. to form a water soluble product.

14. The modified ammonium polyphosphate product of claim 1.

15. The modified ammonium polyphosphate product of claim 3.

16. The modified ammonium polyphosphate product of claim 6.

17. The modified ammonium polyphosphate product of claim 8.

18. The modified ammonium polyphosphate product of claim 9.

19. The modified ammonium polyphosphate product of claim 10.

20. The modified ammonium polyphosphate product of claim 11.

References Cited
UNITED STATES PATENTS

| | | | |
|---|---|---|---|
| 3,397,035 | 8/1968 | Shen et al. | 23—106 |
| 3,495,937 | 2/1970 | Shen et al. | 23—106 |
| 3,345,297 | 10/1967 | Meyer et al. | 252—137 |
| 3,431,210 | 3/1969 | Shen | 252—135 |
| 3,574,534 | 4/1971 | Shaver et al. | 23—107 |
| 3,321,406 | 5/1967 | Shen | 252—137 |
| 3,303,134 | 2/1967 | Shen et al. | 252—135 |

GEORGE F. LESMES, Primary Examiner

W. R. DIXON, Jr., Assistant Examiner

U.S. Cl. X.R.

252—2, 7, 135, 526, 545; 423—309, 302, 305